United States Patent [19]

Inoue

[11] Patent Number: 5,175,857

[45] Date of Patent: Dec. 29, 1992

[54] SYSTEM FOR SORTING RECORDS HAVING SORTED STRINGS EACH HAVING A PLURALITY OF LINKED ELEMENTS EACH ELEMENT STORING NEXT RECORD ADDRESS

[75] Inventor: Sakae Inoue, Saitama, Japan

[73] Assignee: Kabushiki Kaisha Toshiba, Kawasaki, Japan

[21] Appl. No.: 458,361

[22] Filed: Dec. 28, 1989

[30] Foreign Application Priority Data

Dec. 28, 1988 [JP] Japan ............... 63-333587

[51] Int. Cl.⁵ .............................. G06F 7/24
[52] U.S. Cl. ...................... 395/800; 340/146.2; 364/DIG. 2; 364/955; 364/957; 364/957.3; 364/947; 364/947.2
[58] Field of Search ... 364/200 MS File, 900 MS File; 340/146.2; 395/800

[56] References Cited

U.S. PATENT DOCUMENTS

| | | | |
|---|---|---|---|
| 3,931,612 | 1/1976 | Stevens et al. | 364/900 |
| 4,031,520 | 6/1977 | Rohner | 364/900 |
| 4,086,628 | 4/1978 | Woodrum | 364/200 |
| 4,209,845 | 6/1980 | Berger et al. | 340/146.2 |
| 4,279,015 | 7/1981 | Edelman et al. | 364/200 |
| 4,499,555 | 2/1985 | Huang | 364/900 |
| 4,510,567 | 4/1985 | Chang et al. | 364/300 |
| 4,520,456 | 5/1985 | Miraukér et al. | 364/900 |
| 4,567,572 | 1/1986 | Morris et al. | 340/146.2 |
| 4,575,798 | 3/1986 | Lindstorm et al. | 364/200 |
| 4,611,280 | 9/1986 | Linderman | 364/300 |
| 4,611,310 | 9/1986 | Durbin | 365/230.01 |
| 4,651,301 | 3/1987 | Ballmer et al. | 340/146.2 |
| 4,674,039 | 6/1987 | Chouary | 340/146.2 |
| 4,679,139 | 7/1987 | Durbin | 340/146.2 |
| 4,799,149 | 1/1989 | Wolf | 364/200 |
| 4,799,152 | 1/1989 | Chuang et al. | 340/146.2 |
| 4,809,158 | 2/1989 | McCauley | 364/200 |
| 4,873,625 | 10/1989 | Archer et al. | 364/200 |
| 4,962,451 | 10/1990 | Case et al. | 364/900 |
| 4,991,134 | 2/1991 | Ivsin | 364/900 |

*Primary Examiner*—Thomas C. Lee
*Assistant Examiner*—Mehmet Geckil
*Attorney, Agent, or Firm*—Cushman, Darby & Cushman

[57] ABSTRACT

A method and apparatus for sorting object data, the object data having a data format of a next address and a record. The next address indicates the address of another object data, and the record includes information data which is the subject of the sort. The sorting method and apparatus perform two sorting processes. The first process performs a divisional sort which sorts the object data into blocks of object data; these blocks being sorted with respect to one another. In sorting the object data into these object data blocks, it is unnecessary to actually move the object data within the memory. Instead, only one address of an object data out of all the object data in a block needs to be stored. Use is made of the next address of the object data to link the remaining object data to the single object data stored in an object data block. Then the second sorting process performs a sort of the object data in each block; thus all the object data becomes sorted. By the combination of the two sorting processes, an overall sort of the object data is performed in less time.

12 Claims, 7 Drawing Sheets

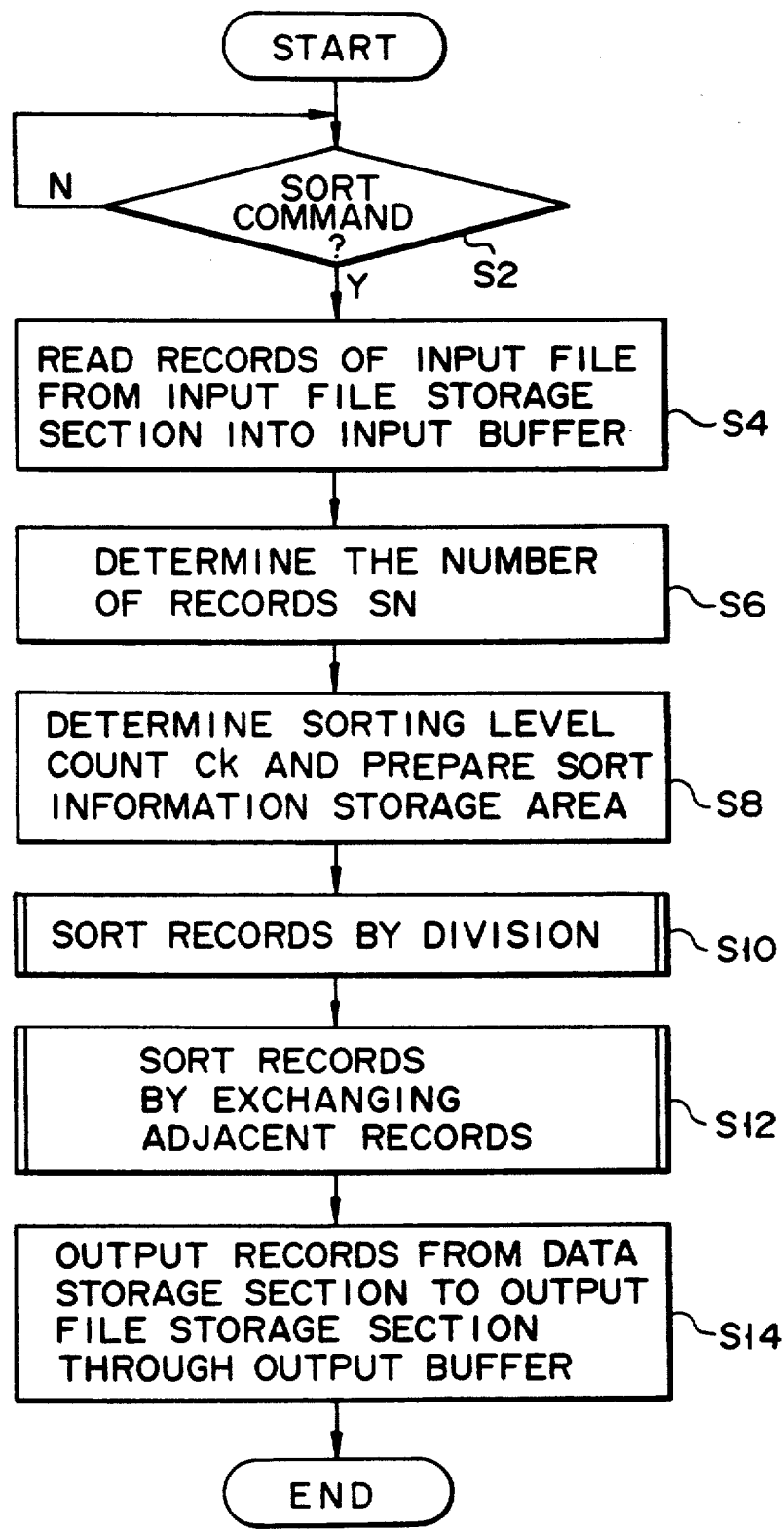
F I G. 3

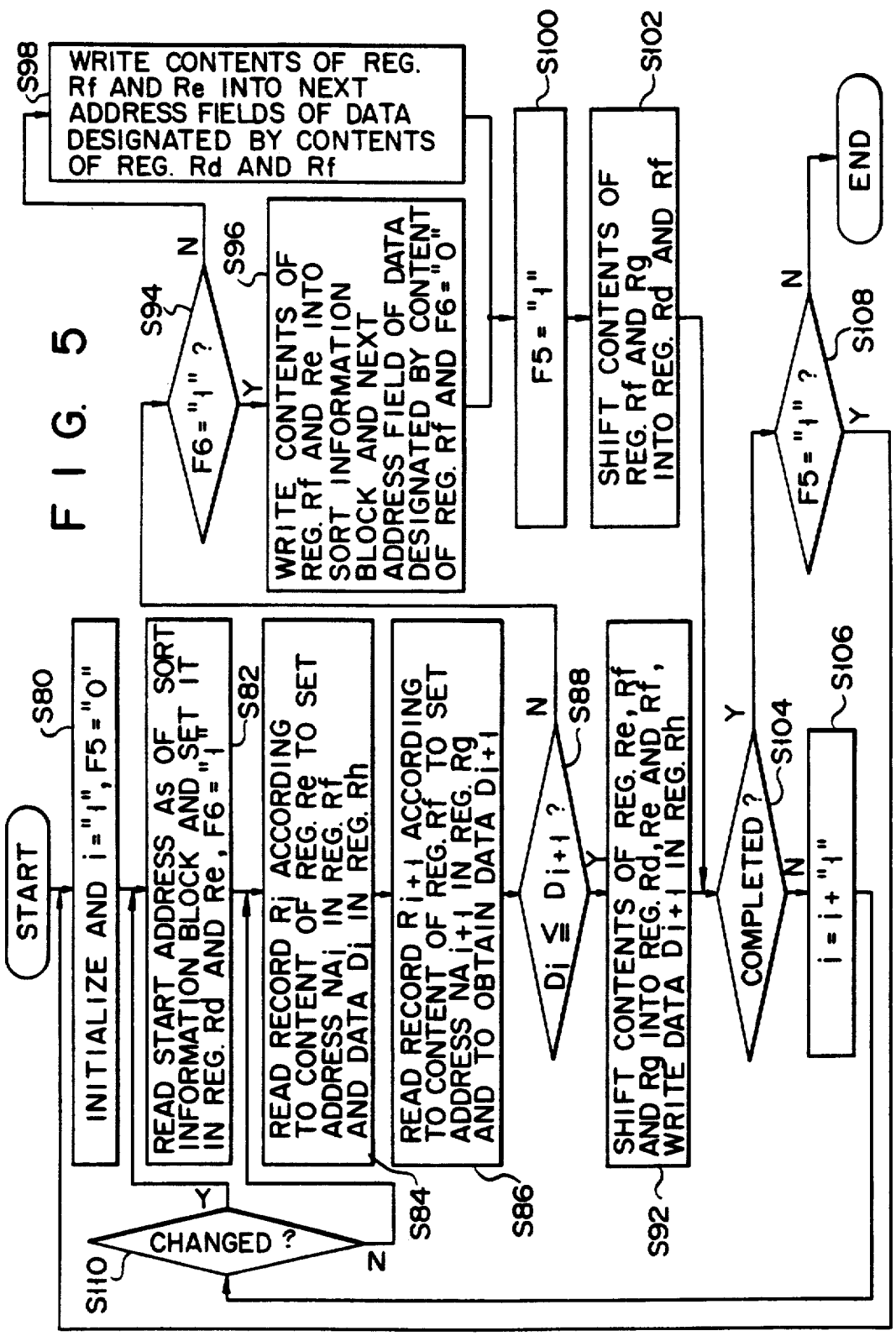

FIG. 6A

| | | | | | |
|---|---|---|---|---|---|
| 2 | 8 | 10 | 4 | 1 | 7 |

| 30 | 20 | 50 | 40 | * | * |
|---|---|---|---|---|---|
| 2 | 8 | 10 | 4 | 1 | 7 |

| 40 | 20 | * | * | * | * |
|---|---|---|---|---|---|
| 2 | 8 | 10 | 4 | 1 | 7 |

| * | * | * | * | * | * |
|---|---|---|---|---|---|
| 2 | 8 | 10 | 4 | 1 | 7 |

| | | | | | |
|---|---|---|---|---|---|
| 2 | 8 | 10 | 4 | 1 | 7 |

| 30 | 20 | 50 | 40 | 10 | * |
|---|---|---|---|---|---|
| 2 | 8 | 10 | 4 | 1 | 7 |

| 40 | 20 | * | 50 | 30 | 10 |
|---|---|---|---|---|---|
| 2 | 8 | 10 | 4 | 1 | 7 |

| 30 | 20 | * | 50 | 0 | 10 |
|---|---|---|---|---|---|
| 2 | 8 | 10 | 4 | 1 | 7 |

0, 10, 20, 30, 40, 50

SYSTEM FOR SORTING RECORDS HAVING SORTED STRINGS EACH HAVING A PLURALITY OF LINKED ELEMENTS EACH ELEMENT STORING NEXT RECORD ADDRESS

BACKGROUND OF THE INVENTION

1. Field of the Invention

The present invention relates to a method of and an apparatus for sorting records, which are ordered at random, according to a specific rule without moving the records, thereby forming a sort string.

2. Description of the Related Art

There are known various methods of sorting, according to specific rules, records stored at random in a file. When such records are sorted by, for example, a divisional method to form a sort string, the records are read out from the file and stored in a main memory in a computer system. Then, a boundary value necessary for dividing the records is set, and sort condition data of each record is compared with the boundary value. According to the result of comparison, a record having the sort condition data equal to or larger than the boundary data is moved to a right region of the main memory and a record having the sort condition data smaller than the boundary data is moved to a left region thereof. A similar process is repeatedly performed for all the records to form a well-ordered sort string in the main memory.

However, in the above sorting method, the records are actually moved for sorting. When the data length of the records is large, a considerable time is taken for the movement of the records. Consequently, the sorting process takes a long time.

SUMMARY OF THE INVENTION

The present invention has been made in consideration of the above circumstances, and its object is to provide a sorting method of and a sorting apparatus for forming a sort string, without actually moving records.

In order to achieve the above object, the sorting apparatus includes a storage section, an address setting section, an information storage section, and a division section. The storage section stores a plurality of object data, the data being divided into a plurality of blocks each object data including a record accompanied with a next address; the next address indicating an address at which an object data is to be read out subsequently; and the record including a sort condition data. The address setting section sets the input next address The information storage section stores sort information. The division section reads out predetermined boundary data and a next address both corresponding to a given block from the sort information. Based on this information, the division section outputs the read-out next address selectively to the address setting section. The division section reads out one of the object data which corresponds to the block and is stored in the storage section, in accordance with the next address set in the address setting section. The division section associates a storage address of the read-out object data, in accordance with sort condition data and boundary data of the read-out object data, with one of just-prior smaller object data including sort condition data smaller than the boundary data and just-after greater object data including sort condition data greater than the boundary data. Further, the division section, when the just-prior smaller object data is not present, writes the storage address of the read-out object data in the data storage section and outputs the next address of the read-out object address to the address setting section.

Also, in order to achieve the above object, the method includes the computer steps of:

reading out one of object data from storage means in accordance with a set next address, each object data including a next address and a record, the next address indicating an address at which a subsequently read-out data is stored, and the record including sort condition data;

writing a storage address of the object data at the next address of one of just-prior smaller object data having a sort condition data smaller than a boundary data, and just-after greater object data having sort condition data equal to or greater than the boundary data, in accordance with the sort condition data of the read-out object data and the boundary data relating to the read-out object data; and setting the next address of the read-out object data.

As is apparent from the above, according to the present invention, the records are not actually moved and reordered. Thus, even in the case where the data length of the records is large, the sorting process can be carried out at high speed. Also, a plurality of sorting modes are applicable in accordance with the number of records to be sorted, and the flexibility of the sorting process is enhanced.

BRIEF DESCRIPTION OF THE DRAWINGS

FIG. 3 is a general flowchart for explaining a first operation of the sorting apparatus shown in FIG. 1;

FIG. 5 is a flowchart for explaining a second sorting process by means of an adjacent-record exchange method;

FIGS. 6A, 6B, 6C, 6D and FIG. 7 are views for explaining the first operation of the sorting apparatus; and FIG. 8A, 8B, 8C and 8D are views for explaining a modification of the first sorting process of the sorting apparatus.

DETAILED DESCRIPTION OF THE PREFERRED EMBODIMENTS

A sorting apparatus according to the present invention will now be described with reference to the accompanying drawings.

Figure 1:
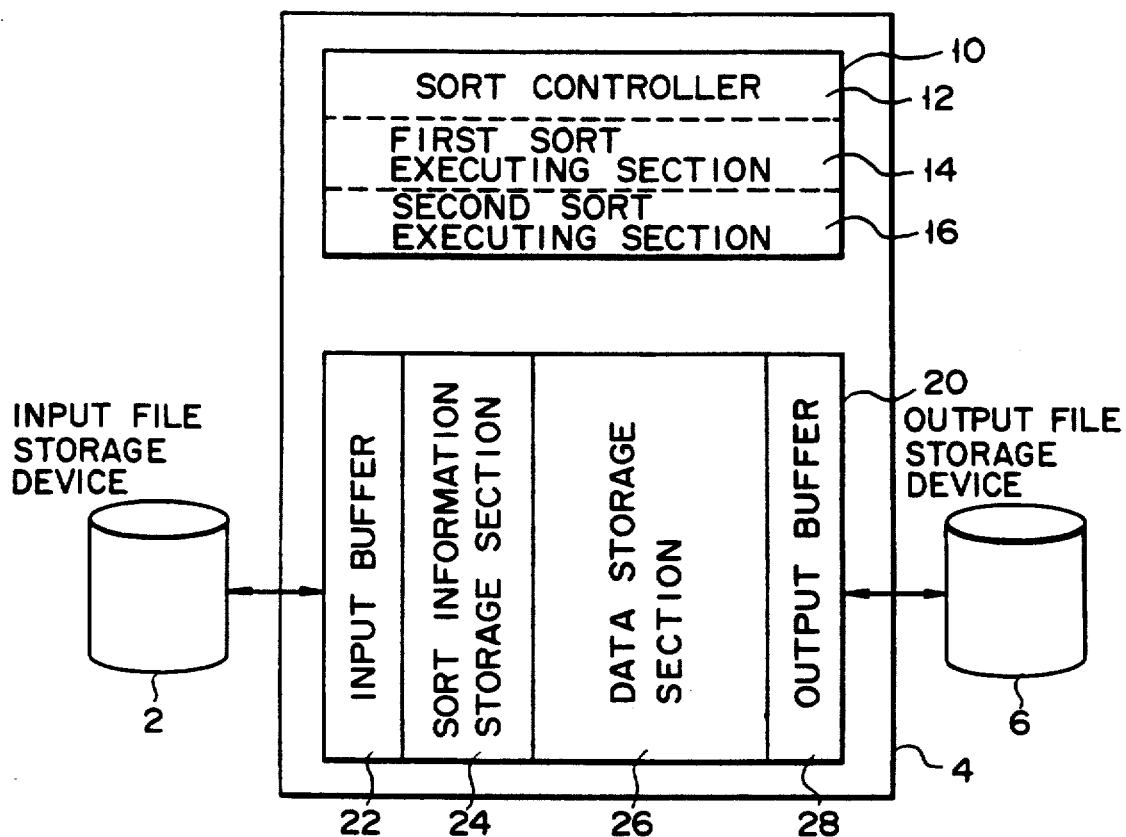
FIG. 1 block diagram showing configuration of a sorting apparatus according to an embodiment of the present invention.

First, with reference to FIG. 1, configuration of a sorting apparatus according to an embodiment of the present invention will be described. The sorting apparatus includes a sorting section 4, an input file storage section 2 and an output file storage section 6. The storage sections 2 and 6 are connected to the sorting section 4, and are constituted by, for example, magnetic disc devices. The input file storage section 2 stores an input file containing a plurality of records. Each record is stored in one or more physical blocks of the section 2. The output file storage section 6 stores a sort string, as an output file, which is formed by the sorting process.

Figure 2:
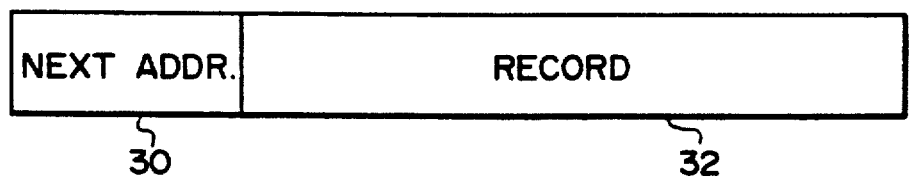
FIG. 2 shows a format of a data stored in a data storage section.

The sorting section 4 is constituted by a CPU, a memory, etc. The sorting section 4 has a control section 10 and a storage section 20. The control section 10 includes a sort controller 12 for controlling the overall operation of the sorting process, a first sort executing section 14 for executing a first sorting process by means of a divisional method, and a second sort executing section 16 for executing a second sorting process by means of an adjacent-record exchange method. The controller 12 executes processes necessary for the sorting operation, and controls the first and second sort executing sections 14 and 16. The storage section 20 includes an input buffer 22, a sort information storage section 24, a data storage section 26, and an output buffer 28. FIG. 2 shows a format of a data stored in the data storage section 26. A record is accompanied with a next address, thus forming one data. The next address indicates a top address of data to be referred to subsequently.

A first operation of the sorting apparatus will now be described with reference to FIGS. 3 to 7. In step S2, the sort controller 10 is waiting for the input of a sort command. Once the sort command is input, the controller 12 accesses the input file storage section 2, and reads records of an input file to be sorted, in units of one or more physical blocks, into the input buffer 22, step S4. In step S6, the controller 12 determines the number of records SN in the input buffer 22.

In step S8, the controller 12 determines a sorting level count Ck, on the basis of the number of records SN. The sorting level count Ck indicates how many times the records should be subjected to the divisional sort process by the first sort executing section 14. In this case, if the records are divided into blocks each containing only one record, the sorting time is elongated. Thus, the divisional sort process is carried out by the first sort executing section, until the number of records in one block becomes less than about 10. Accordingly, an integer satisfying the following inequality is calculated as the sorting level count Ck.

$$SN/2^{Ck} < 10$$

$$Ck > \log(SN/10)/\log 2$$

where SN is the number of records. The reason why the value "10" is selected is that there is no great difference in process time between sorting methods when the number of records is less than about 10, and the process time becomes shorter when unnecessary processes may be omitted. In step S8, further, based on the determined sorting level count Ck, a sort information storage area is prepared in a sort information storage section in units of sort information blocks. Each sort information block includes a common information area, a small data area and a large data area. The common area for storing common information regarding the block includes sorting level data and boundary data. The small data area is for storing information regarding data smaller than the boundary data, and includes a block start address of first data in the smaller data and the number of records. The large data area is for storing information regarding data, and larger than or equal to the boundary data includes a block start address of first data in the larger data and the number of records. Then, the sort controller 12 outputs a first sort process instruction to the first sort executing section 14.

In step S10, in response to the instruction, while the executing section 14 determines whether each of the records stored in the input buffer 22 is or not smaller than the boundary data, by referring to the sort information in the information storage section 24, it adds the next address to each record to form data and transfers the record to the data storage section 26 to store it there in order. Then, the data in the data storage section 26 are further divided (Ck−1) times. The records are divided, based on results of determination as to whether sort condition data in each record is smaller than, equal to, or larger than the boundary data. If a given record is determined to be smaller than the boundary data, the given record is accompanied with, as a next address, a storage address in storage section 26 of a record subsequent to the given record which record is determined to be smaller than the boundary data. After the completion of the first sort process, the controller 12 outputs a second sort process instruction to the second sort executing section 16. In response to the second sort process instruction, the executing section 16 sorts data stored in the storage section 26 by an adjacent-record exchange method, by referring to the sort information storage section 24.

After the completion of the second sort process by the executing section 16, the controller 12 causes the records stored in storage section 26 to be output to the output file storage section 6 through the output buffer 28, by referring to the information storage section 24 (step S14).

Prior to a detailed description of the first sort process in step S10, the principle of the first sort will be described with reference to FIGS. 6A to 6D and FIG. 7.

In the example shown in these figures, the number of records is 6, and the records are divided to the final stage. An input file contains six records, as shown in FIG. 6A, and sort condition data of the records are "2", "8", "10", "4", "1" and "7". These records are read in the input buffer 22. Suppose that data "5" is set as a boundary data by the controller 12. The data "5" is written in a top sort information block 30 in the information storage section 24. There are known various methods for determining the boundary data, and any one of these may be used.

The controller 12 sequentially transfers the records from the input buffer to the storage section 26, as shown in FIG. 6B. It should be noted that the order of records remains the same, during the transfer. The sort condition data "2" of the first record is compared with the data "5". Since the data "2" is determined to be smaller than the data "5", an address "0" for the first record is written in the register in a small data area 54 of the sort information block 30. Then, the sort condition data of the second record is "8", and is this data is the first greater than the boundary data "5"; thus, the second record is stored in a large data region 56 in the block 30. The sort condition data of the third record is "10" and its storage address is "20"; thus, the address "20" for the third record is written in the next-address field of the second record. When there is no subsequent record, symbol "*" is written in the next-address field to signal the end of object data in this object data block. Similarly, the six records are divided, and the numbers of records "3" and "3" are written in the small data area 54 and the large data area 56. While the above-described divisional process is being carried out, boundary data "3" and "8" in level 2 divisional process are determined and written in sort information blocks 32 and 34 of level 2. In this manner, the divisional process in level 1 is completed.

The divisional process in level 2 is then executed. First, the divisional process is performed for the records determined to be smaller than the boundary data "5" in level 1. The first boundary data "3" in level 2 is stored in the sort information block 32. In the same manner as in level 1, the first record is processed, in accordance with the address "0" of the small data area 54 of sort information block 30 of level 1, and then the fourth and fifth records are processed in accordance with the next addresses, on the basis of the sort condition data of each record and the boundary data "3". As a result, the sort information block 32 is obtained. Similarly, a sort information block 34 is obtained. The records in the storage section 26 in level 2 are shown in FIG. 6C.

Figure 7:
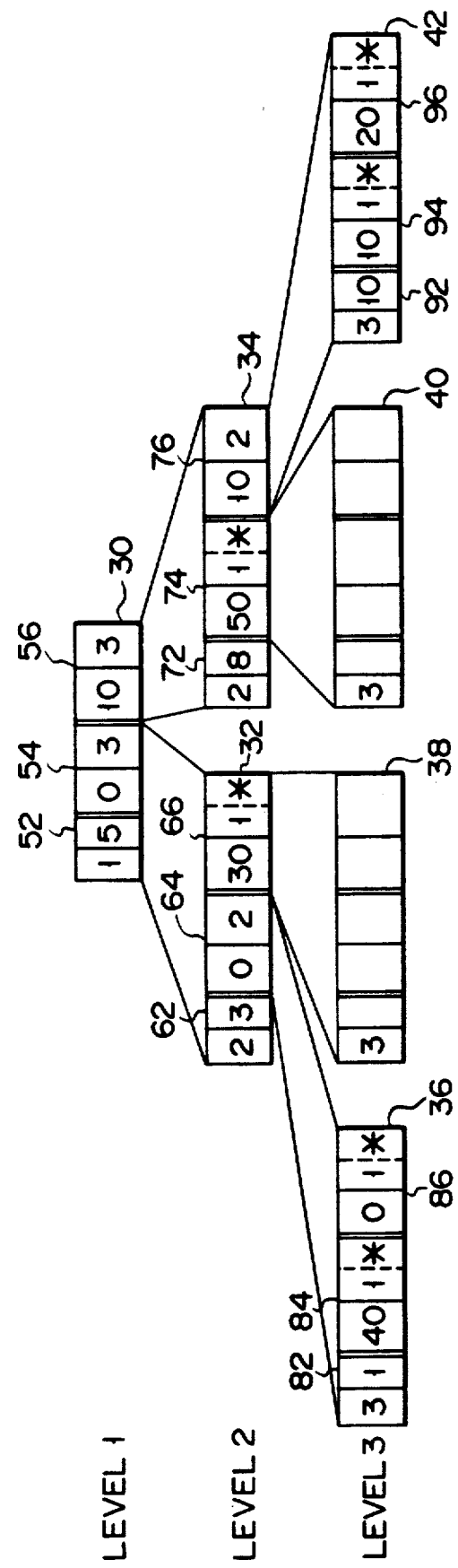

Then, the divisional process in level 3 is carried out with reference to the sort information blocks 32 and 34. Finally, the records shown in FIG. 6D and the sort information blocks shown in FIG. 7 are obtained. In this example, the divisional process has been carried out until each block has one record or sort condition data of the same value. However, in fact, the divisional process is performed until each block contain about 10 records in the embodiment.

Figure 4A:
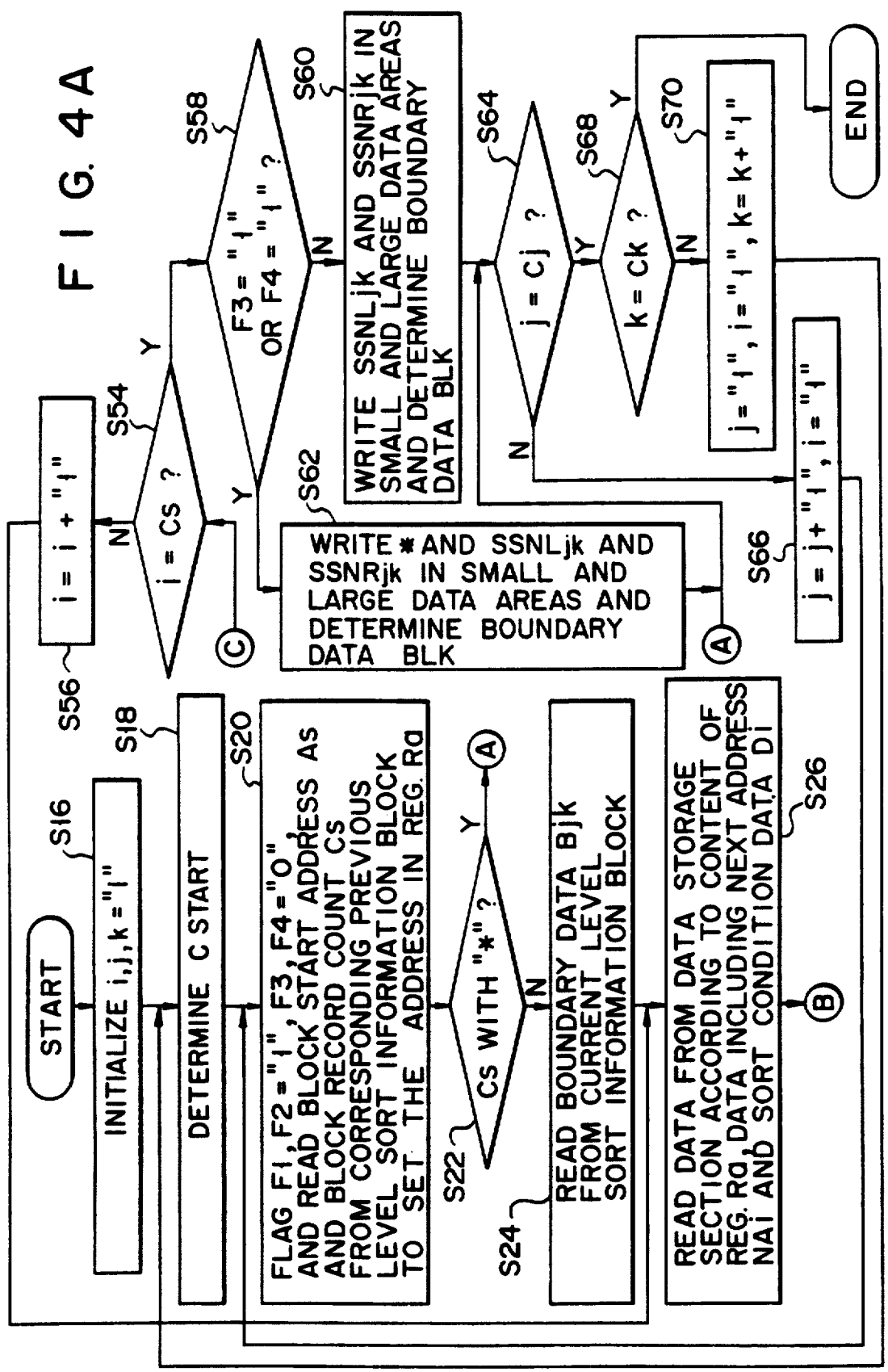
FIGS. 4A and 4B are flowcharts for explaining a first sorting process by means of a divisional method.
Figure 4B:
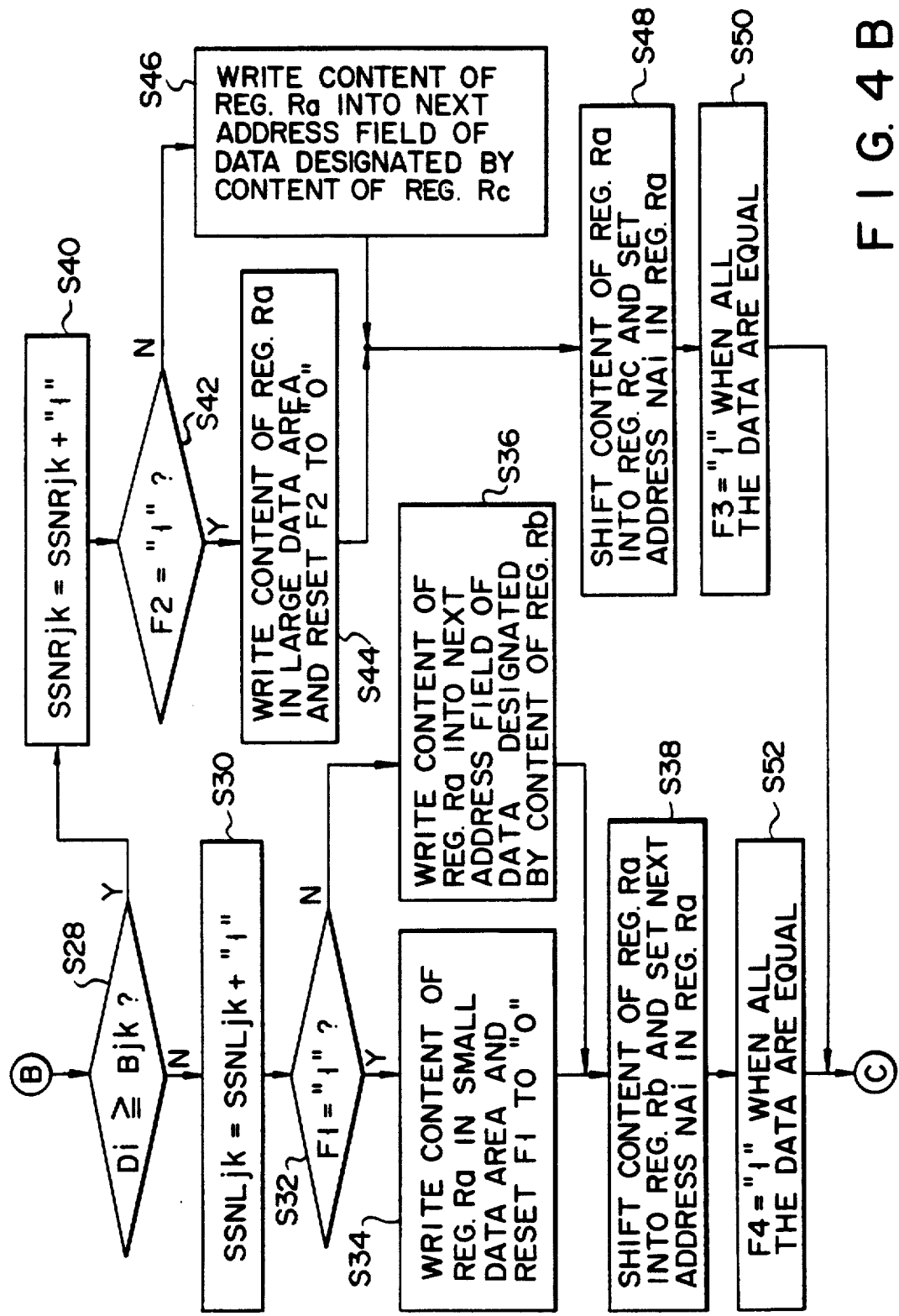

The first sort process or divisional process executed by the executing section 14 will now be described in detail with reference to FIGS. 4A and 4B.

In step S16, the divisional process is initialized, and variables i, j, and k are set to 1. In step S18, the number of small data and large data areas Cstart. In step S20 Flags F1 and F2 are set to one, Flags F3 and F4 are set to zero, and a start address As and a block record count Cs are read from the corresponding previous level sort information block, and the start address As is set in a register Ra (not shown). In the level 1 sort process, the start address is "0". In step S22, it is checked whether or not the number of records Cs is accompanied with symbol "*". The symbol "*" is written in a record number region when all sort condition data of the records in the block are identical. When "Yes (Y)" in step S22, the process in step S64 is executed. If "No (N)", the process in step S24 is executed. In step S24, boundary data Bjk is read from the current level sort information block. In step S26, according to the content of the register Ra, data, including next address data NAi and sort condition date Di is read out from the input buffer 22 at the time of the level 1 sort process (k=1), and this data is read out from the storage section 26 at the time of level 2 or subsequent level sort process (k≧2). In the level 1 sort process, data is stored in the storage section 26. In step S28, the sort condition data of the record is compared with the boundary data.

On the basis of the comparison in step S28, when the sort condition data is smaller than the boundary data, step S30 is executed, and the block record number SSNLJK is incremented by 1. The numbers SSNLji and SSNLJK are reset to "0" in advance. In step 32, it is checked whether the flag F1 is equal to "1". When F1="1", the current record is determined to be a small one at the top of the current block, and step S34 is executed. Thus, the content of the register Ra is written in the small data area. Then, the flag F1 is reset to "0". When "N" in step S32, step S36 is executed to write the content of the register Ra into the next address field of the data designated by the content of the register Rb (not shown). Namely, in the level 1 sort process, the next address is added. In step S38, the contents of register Ra are shifted into register Rb, and register Ra is set to the next address NAi. In step S52, it is checked whether the sort condition data of the records in the block, obtained up to the present, are equal. If they are equal to each other, the flag F4 is set to "1".

On the basis of the comparison in step S28, when the sort condition data is larger than the boundary data step S40 is executed, and the block record number SSNRJK is incremented by 1. In step 42, it is checked whether the flag F2 is equal to "1". When F1="1", the current record is determined to be a large one at the top of the current block, and step S44 is executed. Thus, the content of the register Ra is written in the large data area. Then, the flag F2 is reset to "0". When "N" in step S42, step S46 is executed to write the content of the register Ra into the next address field of the data designated by the content of a register Rc (not shown). Namely, in the level 1 sort process, the next address is added. In step S48, the contents of register ra are shifted into register Rc, and register Ra is set to the next address NAi. In step S50, it is checked whether the sort condition data of the records in the block, obtained up to the present, are equal. If they are equal, the flag F3 is set to "1".

In step S54, it is checked if i=Cs, that is, if all data in the block have been subjected to division. If "N" in step S54, step S56 is executed to increment i by "1", and then step S26 is executed. If "Y" in step S54, step S58 is executed to check whether the flag F3 or F4 is "1", that is, whether all data in the block have the same sort condition data. If "N" in step S58, step S60 is executed to write small-range data number SSNLJK and large-range data number SSNRjk in the small and large data areas. When "Y" in step S58, symbol "*" is added to the data number as in step S62. Thereafter, the boundary data for the next sort information block is determined and written therein.

In step S64, it is checked if all blocks in the level designated by k have been processed. If "N" in step S64, i is set to "1", j is incremented by 1, and the process returns to to the divisional process at step S20. When "Y" in step S64, step S68 is executed to check if the process in all levels has been completed. If "N" in step S70, i and j are set to 1 and k is incremented by "1". Then, step S18 is executed again. If "Y" in step S68, the divisional process has been completed.

The sort process by the adjacent-record exchange method executed by the second sort executing section in step S12 will now be described in detail with reference to FIG. 5. In step S80, i is initialized to "1", and flag F5 is initialized to "0". In step S82, a block start address is read out from the corresponding sort information block, and is set in registers Rd and Re (not shown). Also, the flag F6 is set to "1". In step S84, record data $R_i$ is read out in accordance with the content of the register Re, and the next address $NA_i$ is set in a register Rf (not shown), and sort condition data $D_i$ is set in a register Rh (not shown). In step 86, record data $R_{i+1}$ is read out according to the content of the register Rf, the next address $NA_{i+1}$ is stored in a register Rg (not shown), and sort condition data $D_{i+1}$ is obtained.

In step S88, the sort condition data $D_i$ is compared with the sort condition data $D_{i+1}$. If $D_i \leq D_{i+1}$, step S92 is executed to shift the contents of the registers Re, Rf and Rg to the registers Rd, Re and Rf, and to write data $D_{i+1}$ in the register Rh. If $D_i > D_{i+1}$ in step S88, step S94 is executed to check if the flag F6 is "1", that is, if the content of the sort information block needs to be rewritten. If "Y" in step S94, step S96 is executed to write the contents of the registers Rf and Re into the sort information block and the next address field of the data designated by the content of the register Rf. Then, the flag F6 is reset to "0". If "N" in step S94, step S98 is executed to write the contents of the registers Rf and Re into the next address fields of the data designated by the contents of the registers Rd and Rf. In step S100, the flag F5 is set to "1", to indicate the need for re-processing. In step S102, the contents of the registers Rf and Rg are shifted to the registers Rd and Rf.

In step S104, it is checked if all data have been processed. If "N" in step S104, step S106 is executed to increment i by "1". In step S110, it is checked if the block has been changed, on the basis of the number of records in the sort information block. If the block has been changed, step S82 is executed. If the block has not been changed, step S84 is executed. When "Y" in step S104, step S108 is executed to check if the flag F5 is "1". If "Y" in step S108, step S80 is executed. If "N" in step S108, the adjacent-record exchange process has been completed.

Once the process in step S12 has been completed, the controller 12, in step S14, outputs the records to the output file storage section 6 through the output buffer 28 in a sorted sequence, by referring to the sort information block and the next address.

A second operation of the sorting apparatus will now be described. The second operation is basically the same as the first operation. Thus, only the difference therebetween is explained. In the second operation, which relates in particular to a modification of the first sorting process, wherein block start addresses may be omitted, excepting the sort information block in level 1. This will be described with reference to FIGS. 8A to 8D. Records shown in FIG. 8A are identical with those shown in FIG. 6A. When FIGS. 6B and 8B are compared, it is seen that the next address field of the sort condition data "1" is accompanied with address "10", and not symbol "*". In other words, a storage address, at which the first data in the large data range is stored, is written in the next address field of the last data in the small data range. Also, as seen from the comparison between FIGS. 6C and 8C, the next address field of the last data in the large data range in each block has the storage address of the start data of the next block. Thus, each record can be read from the storage section 26, without referring to the sort information block, and the processing speed can be increased.

What is claimed is:

1. A method of sorting data using computer equipment in which object data are input from a storage means and sorted in accordance with boundary data, each object data having a data format of a next address and a record, the next address indicating the address of another object data, the record including information data which is subject to sorting, the sorting method comprising the steps of:

executing a first sorting process for sorting the object data into object data blocks based on the boundary data, the first sorting process comprising the steps of:
inputting object data from the storage means,
comparing the information data of an input object data to the boundary data,
storing in a smaller object data block an address of a first object data which the comparing step determined has information data less than the boundary data,
storing in a larger object data block an address of a first object data which the comparing step determined has information data equal to or greater than the boundary data,
changing a next address of a previous object data which the comparing step determined has information data less than the boundary data to an address of a present object data which the comparing step determined has information data less than the boundary data, and
changing a next address of a previous object data which the comparing step determined has information data equal to or greater than the boundary data to an address of a present object data which the comparing step determined has information data equal to or greater than the boundary data; and
executing a second sorting process on the object data in each object data block.

2. A sorting method according to claim 1, wherein in the executing a first sorting process step, an end of object data block symbol is stored in a next address of a last object data which the comparing step determined has information data less than the boundary data; and an end of object data block symbol is stored in a next address of a last object data which the comparing step determined has information data equal to or greater than the boundary data.

3. A sorting method according to claim 1, wherein in the executing a first sorting process step, and address of the object data stored in the larger object data block is stored in a next address of a last object data which the comparing step determined has information data less than the boundary data.

4. A sorting method according to claim 1, wherein the second sorting process is a an adjacent record exchange method.

5. A method of sorting data using computer equipment in which object data are input from a storage device and sorted in accordance with boundary data, each object data having a data format of a next address and a record, the next address indicating the address of another object data, the record including information data which is subject to sorting, the sorting method comprising the steps of:

determining a sort level count based on the number of records being sorted;
executing a first sorting process for sorting the object data into object data blocks based on the boundary data and the sort level count, the first sorting process comprising the steps of:
inputting object data from the storage means,
comparing the information data of an input object data to the boundary data,
storing in a first level smaller object data block an address of a first object data which the comparing step determined has information data less than the boundary data,
storing in a first level larger object data block an address of a first object data which the comparing step determined has information data equal to or greater than the boundary data,
changing a next address of a previous object data which the comparing step determined has information data less than the boundary data to an address of a present object data which the comparing step determined has information data less than the boundary data,
changing a next address of a previous object data which the comparing step determined has information data equal to or greater than the boundary data to an address of a present object data which the comparing step determined has information data equal to or greater than the boundary data, repeating the comparing, storing, and changing steps for the first level smaller and large object data blocks to obtain second level object data blocks, and repeating the comparing, storing and changing steps for the second level object data blocks and each consecutive level of data blocks until and object data block level equals the sort level count; and executing a second sorting process of object data in each object data block.

6. A sorting method according to claim 5, wherein the sort level count is determined based on a desired number of object data per object data block.

7. An apparatus for sorting object data in accordance with boundary data comprising:

storage means for storing object data, each object data having a data format of a next address and a record, the next address indicates the address of another object data, the record includes information data which is subject to sorting;

means for executing a first sorting process for sorting the object data into object data blocks based on the boundary data, the means for executing the first sorting process comprising:

input means for inputting object data from the storage means, comparing means for comparing the information data of an input object data to the boundary data, second storage means for storing in a smaller object data block an address of a first object data which the comparing means determined has information data less than the boundary data, and storing in a larger object data block an address of a first object data which the comparing means determined has information data equal to or greater than the boundary data, changing means for changing a next address of a previous object data which the comparing means determined has information data less than the boundary data to an address of a present object data which the comparing means determined has information data less than the boundary data, and changing a next address of a previous object data which the comparing means determined has information data equal to or greater than the boundary data to an address of a present object data which the comparing means determined has information data equal to or greater than the boundary data; and means for executing a second sorting process of object data in each object data block.

8. A sorting apparatus according to claim 7, wherein the changing means stores an end of object data block symbol in a next address of a last object data which the comparing means determined has information data less than the boundary data, and stores an end of object data block symbol in a next address of a last object data which the comparing means determined has information data equal to or greater than the boundary data.

9. A sorting apparatus according to claim 7, wherein the changing means stores the address of the object data stored in the larger object data block in a next address of a last object data which the comparing means determined has information data less than the boundary data.

10. A sorting apparatus according to claim 7, wherein the means executing a second sorting process executes an adjacent record exchange sort.

11. An apparatus for sorting object data in accordance with boundary data comprising:

storage means for storing object data, each object data having a data format of a next address and a record, the next address indicates the address of another object data, the record includes information data which is subject to sorting;

determining means for determining a sort level count based on the number of record being sorted;

means for executing a first sorting process for sorting the object data into object data blocks based on the boundary data and sort level count, the means for executing the first sorting process comprising:

input means for inputting object data from the storage means, comparing means for comparing the information data of an input object data to the boundary data, second storage means for storing in a first level smaller object data block an address of a first object data which the comparing means determined has information data less than the boundary data, and storing in a first level larger object data block an address of a first object data which the comparing means determined has information data equal to or greater than the boundary data, changing means for changing a next address of a previous object data which the comparing means determined has information data less than the boundary data to an address of a present object data which the comparing means determined has information data less than the boundary data, and changing a next address of a previous object data which the comparing means determined has information data equal to or greater than the boundary data to an address of a present object data which the comparing means determined has information data equal to or greater than the boundary data, and said means for executing a first sorting process causing the comparing means, second storage means, and changing means to operate on the first level smaller and larger object data blocks to create second level object data blocks, and causing the comparing means, second storage means, and changing means to operate on the second level and consecutive levels of object data blocks until an object data block level equals the sort level count; and means for executing a second sorting process of object data in each object data block.

12. A sorting apparatus according to claim 11, wherein the sort level count is determined based on a desired number of object data per object data block.

* * * * *